United States Patent [19]

Bayless

[11] Patent Number: 5,464,555
[45] Date of Patent: Nov. 7, 1995

[54] GRAPHIC INK REMOVER SOLUTION

[75] Inventor: Ronnie E. Bayless, Plant City, Fla.

[73] Assignee: Dotolo Research Corporation, Largo, Fla.

[21] Appl. No.: 322,026

[22] Filed: Oct. 12, 1994

Related U.S. Application Data

[63] Continuation of Ser. No. 8,205, Jan. 25, 1993, abandoned.
[51] Int. Cl.$^6$ .............................. C09D 9/04; C11D 7/26; C11D 7/32
[52] U.S. Cl. .................... 252/153; 252/171; 252/542; 252/DIG. 8; 134/38
[58] Field of Search .................. 252/153, 162, 252/170, 171, 542, DIG. 8; 134/38

[56] References Cited

U.S. PATENT DOCUMENTS

| | | | |
|---|---|---|---|
| 3,686,701 | 8/1972 | Charle et al. | 252/364 |
| 3,870,536 | 3/1975 | Blanco et al. | 106/146 |
| 3,954,648 | 5/1976 | Belcak et al. | 252/158 |
| 4,710,497 | 12/1987 | Heller et al. | 514/221 |
| 4,836,950 | 6/1989 | Madsen et al. | 252/153 |
| 5,011,621 | 4/1991 | Sullivan | 252/162 |
| 5,098,591 | 3/1992 | Stevens | 252/162 |
| 5,145,671 | 9/1992 | Castrogiovanni et al. | 424/61 |
| 5,215,675 | 6/1993 | Wilkins et al. | 252/100 |

FOREIGN PATENT DOCUMENTS

| | | |
|---|---|---|
| 3-37299 | 2/1991 | Japan . |
| 3-41170 | 2/1991 | Japan . |
| 4-323299 | 11/1992 | Japan . |

OTHER PUBLICATIONS

*Grant & Hackh's Chemical Dictionary* 5th Ed. McGraw Hill Book Co. N.Y. 1987, no month available p. 607.
Mellan, I., *Industrial Solvents Handbook*, Second Edition, Noyes Data Corporation New Jersey 1977, no month available p. 71.

*Primary Examiner*—Linda Skaling Therkorn
*Attorney, Agent, or Firm*—Donald R. Fraser

[57] ABSTRACT

A liquid, non-aqueous, one-step graphic ink remover cleaner composition that is well suited for removing graphic ink, the composition comprising d-limonene, ethyl lactate, NMP, and a surfactant.

8 Claims, No Drawings

GRAPHIC INK REMOVER SOLUTION

This application is a continuation of application Ser. No. 08/008,205, filed Jan. 25, 1993, now abandoned.

FIELD OF THE INVENTION

The present invention relates to a coating removal and all-purpose cleaning composition and, more particularly, to a one step graphic ink remover composition.

BACKGROUND OF THE INVENTION

Conventional graphic ink remover solutions or compositions have drawbacks and are not always efficient enough to remove graphic ink from screens and printing equipment during color change over and at the end of the printing job. Material such as acetone, ethyl acetate and alcohol often have a disagreeable odor, irritates eyes and are flammable and combustible which can be harmful to the user.

OBJECTS OF THE INVENTION

It is an object of the present invention to provide an easy-to-make, easy-to-use very efficient one step graphic ink remover compositions and methods of using the compositions.

It is a further object of the present invention is to provide a very effective, non-toxic, non-methylene chloride, acetone, ethyl acetate or alcohol containing graphic ink remover comprising d-limonene, ethyl lactate, NMP (n-methyl pyrrolidone) and a surfactant.

Still another object of the present invention to provide a non-aqueous liquid cleaning composition especially adapted graphic ink from screens for removing graphic ink from screens, the composition comprising the following ingredients in approximate percent by weight:

| Ingredients | % by weight |
| --- | --- |
| 1. d-limonene | 30–80 |
| 2. ethyl lactate | 10–50 |
| 3. NMP | 5–30 |
| 4. surfactant | 0.5–5 |

These and other objects will be apparent from the specification and claims that follow.

SUMMARY OF THE INVENTION

The present invention provides a liquid non-aqueous composition comprising the following ingredients:
1. d-limonene;
2. ethyl lactate;
3. NMP;
4. surfactant; and
5. optionally, gamma butyrolactone in place of 5 or 10 up to 50% of the NMP to provide benefits of a lower odor and a faster evaporation rate.

The present invention provides an effective, non-toxic, non-aqueous liquid graphic ink remover, cleaner and remover composition comprising the following ingredients in the general and preferred ranges set forth in approximate percent by weight:

| | % by weight | | |
| --- | --- | --- | --- |
| Ingredients | General | Preferred | Ideal |
| 1. d-limonene | 30–80 | 50–68 | 59 |
| 2. ethyl lactate | 10–50 | 17–32 | 25 |
| 3. NMP | 5–30 | 10–20 | 15 |
| 4. surfactant | 0.5–5 | 0.8–2 | 1 |

Optionally, gamma butrolactone and glycol ether can be used as well as a surfactant such as ethoxylated undecyl alcohol and preferably, amine alkyl benzene sulfonate (Stepa Ninate 411™). These formulations are as follows in approximate % by weight:

| | Ingredient | Optimal | General |
| --- | --- | --- | --- |
| 1. | d-limonene | 59 | 30–80 |
| 2. | ethyl acetate | 20 | 15–45 |
| 3. | gamma butyrolactone | 5 | 5–25 |
| 4. | NMP | 15 | 5–30 |
| 5. | surfactant such as ethoxylated undecyl alcohol | 1 | 0.5–5 |

DETAILS OF THE INVENTION

The compositions of the present invention, while preferably used as a graphic ink remover for screens, also can be used as an all purpose cleaner and, in particular hard surface cleaners, blanket washes for use in the printing industry, cleaners for brake linings, silk screens, and copier belts.

The easy to use, easy to make cleaning composition is made by mixing generally the three liquid ingredients (d-limonene, ethyl lactate and NMP) with a surfactant to form a homogenized stable cleaning mixture having enhanced detergent and stripping powers. Ethyl lactate helps increase the speed of the cleaning action. This combination of NMP, d-limonene and ethyl lactate is necessary for the removal of most of the graphic ink encountered. The d-limonene component is a solvent or diluent that assists in penetrating and stripping or removing of the inks that coat the screens.

The d-limonene helps to loosen or dissolve grease, fat or organic materials, and is described as an ingredient in a cleaner in U.S. Pat. Nos. 4,790,951 and 5,031,648.

When N-methyl pyrrolidone (NMP) is used as a solvent in the composition, generally NMP is used in lower amounts than d-limonene and ethyl lactate. U.S. Pat. No. 4,605,670 discloses a percutaneous (drug) absorption composition including NMP and other ingredients such as alcohols or esters including cetyl acetate. U.S. Pat. No. 5,011,621 is directed to a paint stripper composition and discloses the use of NMP, an oil, and a plurality of cosolvents including terpenes. U.S. Pat. No. 5,098,591 (Stevens) discloses a paint stripper composition that includes NMP, d-limonene and a surfactant, but there is no teaching of the use of ethyl lactate which helps provide superior results.

As indicated, relatively large amounts of ethyl lactate can be used, say, about 10 to 20 up to 50 or 60% by weight. Preferably about 25 to 35 weight percent is used to obtain fast drying. Ethyl lactate is a solvent that is compatible with d-limonene, NMP, and the surfactant. Ethyl lactate enhances the compatibility, efficiency, miscibility, and the stability of the liquid, the speed of drying the non-aqueous d'limonene/NMP combination and enhances the removal time for the more difficult hard nail polish surfaces. Best results are obtained with about 25–32% by weight. As indicated, the total amount of d-limonene in the composition is preferably at least 25 or up to 30–35 percent by weight and more preferably at least about 45 or 55 percent by weight. In some cases, methyl lactate can be used with the ethyl lactate, the methyl lactate being generally about 3 to 5 weight percent up to 50 to 55 weight percent of the combination of ethyl lactate and methyl lactate.

The cleaner composition has an outstanding balance of properties including easy removal of ink coatings on screens on screen and hard surfaces, being non-irritating, having a pleasant order, being quick drying, having miscible ingredients, and leaving the cleaned surfaces free of surface film. The cleaner has the advantage of producing up to two-thirds less Volatile Organic Compounds (VOC) than other products currently in use, to perform the cleaning operation.

The preferred surfactant is amine alkyl benzene sulfonate surfactant. (Stepan Ninate 411™). The alkyl group is generally 1–16 carbon atoms and preferably 4 or 6 up to 8 or 10 carbon atoms. Suitable surfactants are ethoxylated sulfate, phosphate esters and other surfactants mentioned in column 8 of U.S. Pat. No. 5,098,591 (Stevens).

The Stevens patent discloses a terpene (d-limonene); NMP, a surfactant and carbonates or glycol ethers. The carbonates such as ethylene carbonate and propylene carbonates are necessary in the formulation and one of the main thrusts of the Stevens patent. However, there is no suggestion or showing of the use of ethyl lactate or a graphic ink cleaner in Stevens.

What is claimed is:

1. A graphic ink remover, consisting of:

from about 30 to about 80 weight percent d-limonene;

from about 10 to about 50 weight percent ethyl lactate;

from about 5 to about 30 weight percent N-methyl pyrrolidone;

from about 0.5 to about 5 weight percent surfactant; and optionally, from about 0 to about 25 weight percent gamma butyrolactone.

2. The graphic ink remover according to claim 1, wherein the concentration of d-limonene is about 59 weight percent.

3. The graphic ink remover according to claim 1, wherein the concentration of ethyl lactate ranges from about 20 to about 25 weight percent.

4. The graphic ink remover according to claim 1, wherein the concentration of N-methyl pyrrolidone is about 15 weight percent.

5. The graphic ink remover according to claim 1, wherein the concentration of surfactant is about 1 weight percent.

6. The graphic ink remover according to claim 1, wherein the concentration gamma butyrolactone is about 5 weight percent.

7. A graphic ink remover, consisting of:

about 59 weight percent d-limonene;

about 25 weight percent ethyl lactate;

about 15 weight percent N-methyl pyrrolidone; and about 1 weight percent surfactant.

8. A graphic ink remover, consisting of:

about 59 weight percent d-limonene;

about 20 weight percent ethyl lactate;

about 15 weight percent N-methyl pyrrolidone;

about 1 weight percent surfactant; and about 5 weight percent gamma butyrolactone.

* * * * *